US011177482B2

(12) United States Patent
Choi et al.

(10) Patent No.: US 11,177,482 B2
(45) Date of Patent: Nov. 16, 2021

(54) METHOD FOR INFILTRATING WITH PRECURSOR SOLUTION USING MOISTURE CONTROL

(71) Applicants: GLOBAL FRONTIER CENTER FOR MULTISCALE ENERGY SYSTEMS, Seoul (KR); KOREA INSTITUTE OF SCIENCE AND TECHNOLOGY, Seoul (KR); SEOUL NATIONAL UNIVERSITY R&DB FOUNDATION, Seoul (KR)

(72) Inventors: Man Soo Choi, Seoul (KR); Jeong Hun Kim, Seoul (KR); Hyoungchul Kim, Seoul (KR); Ji-Won Son, Seoul (KR); Sung Soo Shin, Seoul (KR); Seung Yong Lee, Seoul (KR)

(73) Assignees: GlobalFrontier Center ForMultiscale Energy Systems, Seoul (KR); Korea Institute Of Science And Technology, Seoul (KR); Seoul National University R&DB Foundation, Seoul (KR)

( * ) Notice: Subject to any disclaimer, the term of this patent is extended or adjusted under 35 U.S.C. 154(b) by 23 days.

(21) Appl. No.: 16/759,822

(22) PCT Filed: Dec. 6, 2018

(86) PCT No.: PCT/KR2018/015368
§ 371 (c)(1),
(2) Date: Apr. 28, 2020

(87) PCT Pub. No.: WO2019/112328
PCT Pub. Date: Jun. 13, 2019

(65) Prior Publication Data
US 2020/0335798 A1    Oct. 22, 2020

(30) Foreign Application Priority Data

Dec. 7, 2017 (KR) .................... 10-2017-0167114

(51) Int. Cl.
*H01M 4/88* (2006.01)
*B05D 1/04* (2006.01)
(Continued)

(52) U.S. Cl.
CPC ............ *H01M 4/8842* (2013.01); *B05D 1/04* (2013.01); *B05D 3/0254* (2013.01);
(Continued)

(58) Field of Classification Search
CPC ............ C04B 38/0058; C04B 38/0096; C04B 2235/658; C04B 2235/656;
(Continued)

(56) References Cited

U.S. PATENT DOCUMENTS 9,748,592 B2    8/2017  Ramaswamy et al.
2004/0043051 A1*  3/2004  Pilliar ............... A61L 27/12
                                                          424/423
2014/0106259 A1*  4/2014  Kwak ................ H01M 4/9033
                                                          429/527

FOREIGN PATENT DOCUMENTS

KR    10-1189680      * 10/2012
KR    10-1189680 B1    10/2012
(Continued)

OTHER PUBLICATIONS

International Search Report for Application No. PCT/KR2018/015368 dated Apr. 9, 2019.

*Primary Examiner* — Tabassom Tadayyon Eslami
(74) *Attorney, Agent, or Firm* — Christensen, Fonder, Dardi & Herbert PLLC; Diane E. Bennett; Peter S. Dardi

(57) ABSTRACT

Disclosed is a method for infiltrating a porous structure with a precursor solution by means of humidification. The infiltration method with a precursor solution using moisture control comprises the steps of: (S1) providing a substrate having porous structures deposited thereon; (S2) depositing, (Continued)

by electrospraying, a precursor solution on the substrate having porous structures deposited thereon; (S3) humidifying the porous structures having the precursor solution deposited thereon; and (S4) sintering the humidified porous structures.

19 Claims, 6 Drawing Sheets

(51) Int. Cl.
  *B05D 3/02* (2006.01)
  *H01M 4/86* (2006.01)
  *H01M 8/1213* (2016.01)
  *H01M 8/124* (2016.01)
(52) U.S. Cl.
  CPC ....... *H01M 4/8621* (2013.01); *H01M 4/8846* (2013.01); *H01M 4/8885* (2013.01); *H01M 8/1213* (2013.01); *H01M 2004/8689* (2013.01); *H01M 2008/1293* (2013.01)
(58) Field of Classification Search
  CPC .............. C04B 2235/6588; B05D 3/065; B05D 3/107; H01M 4/8885; H01M 8/1213
  See application file for complete search history.

(56) References Cited

FOREIGN PATENT DOCUMENTS

| KR | 10-2013-0092368 A | 8/2013 |
| KR | 10-2014-0126718 A | 10/2014 |
| KR | 10-2015-0054492 A | 5/2015 |

\* cited by examiner

METHOD FOR INFILTRATING WITH PRECURSOR SOLUTION USING MOISTURE CONTROL

CROSS REFERENCE TO RELATED APPLICATIONS

This application is a National Stage filing of PCT Application No. PCT/KR2018/015368 filed Dec. 6, 2018, entitled "Method For Infiltrating With Precursor Solution Using Moisture Control", which claims priority to Korean Patent Application No. 10-2017-0167114 filed Dec. 7, 2017, both of which are incorporated herein by reference.

BACKGROUND OF THE INVENTION

1. Field of the Invention

This application claims the benefit of priority to Korean Patent Application No. 10-2017-0167114, filed on Dec. 7, 2017, the entire disclosure of which is incorporated herein by reference.

The present invention relates to a novel method for infiltrating a porous structure with a precursor solution. The present invention can be applied in the case of infiltrating the porous structure with the precursor solution, for example, in the energy technology field, such as fuel cells, more specifically a method for maximizing a reaction area of a catalyst in an electrode of a solid oxide fuel cell.

2. Description of the Related Art

In general, a fuel cell is a high-efficiency clean power generation technology that directly converts chemical energy of a fuel into electrical energy. Since the fuel cells were developed long ago in the United States as a power source for spacecraft, research has been continued in various countries around the world for its use as a general power source. Fuel cells are classified into alkali type, molten carbonate type, solid oxide type, solid polymer type and the like depending on the type of electrolyte used.

The operation principle of solid oxide fuel cell is as follows. Oxygen (or air) injected into a cathode (a positive electrode) is reduced by the catalyst to become oxygen ions, and the oxygen ions go to an anode (a negative electrode) through an electrolyte to meet hydrogen injected into the anode and generate water and electrons.

The generated electrons move back to the cathode through an external circuit and contribute to oxygen reduction. In this case, by improving the reaction area of the cathode or by adding a material having a low activation energy, performance of the fuel cell can be improved.

Conventionally, pipettes or micro pipettes have been used to infiltrate the porous structure with the precursor solution. Since the area of the solution falling off the pipette and spreading to the porous structure was smaller than that of the porous structure, it had to be infiltrated several times at various points on the porous structure. Accordingly, there are disadvantages that it is difficult to uniformize the amount of precursor solution infiltrated into the entire area of the porous structure and the degree of infiltration into the porous structure cannot be controlled.

SUMMARY OF THE INVENTION

In the case of infiltrating a precursor solution into a porous structure, unlike the prior art using a pipette or a micropipette, a technique for uniformly infiltrating the precursor solution over the entire area of the porous structure is required.

The method for infiltrating with a precursor solution using moisture control according to the present invention may comprise the steps of:

(S1) providing a substrate having porous structures deposited thereon;

(S2) depositing, by electrospraying, a precursor solution on the substrate having porous structures deposited thereon;

(S3) humidifying the porous structures having the precursor solution deposited thereon; and (S5) sintering the humidified porous structures.

In addition, in the method for infiltrating with a precursor solution using moisture control according to the present invention, the method may further comprise (S4) heating the humidified porous structures, between the humidifying step (S3) and the sintering step (S5).

In addition, in the method for infiltrating with a precursor solution using moisture control according to the present invention, in the depositing step (S2), the precursor solution may be electrosprayed on the substrate having the porous structures deposited thereon under a relative humidity of 10%.

In addition, in the method for infiltrating with a precursor solution using moisture control according to the present invention, in the humidifying step (S3), humidification of the porous structures having the precursor solution deposited thereon may be performed under a relative humidity of 70%.

In addition, in the method for infiltrating with a precursor solution using moisture control according to the present invention, in the humidifying step (S3), the degree of infiltration of the precursor solution into the porous structure may be controlled according to the amount of humidification.

In addition, in the method for infiltrating with a precursor solution using moisture control according to the present invention, the substrate having the porous structures deposited thereon may be a ceramic substrate having the porous ceramic structures deposited thereon.

In addition, in the method for infiltrating with a precursor solution using moisture control according to the present invention, the substrate having the porous structures deposited thereon may comprise an anode layer, an electrolyte layer, and a cathode layer of a solid oxide fuel cell.

In addition, in the method for infiltrating with a precursor solution using moisture control according to the present invention, the porous structure may include a cathode layer.

In addition, in the method for infiltrating with a precursor solution using moisture control according to the present invention, the precursor solution to be electrosprayed may be a solution comprising deionized water as a solvent and any one selected from the group consisting of lanthanum nitrate hexahydrate, strontium nitrate, cobalt nitrate hexahydrate, citric acid, and a combination thereof.

In addition, in the method for infiltrating with a precursor solution using moisture control according to the present invention, the precursor solution to be electrosprayed may be a cathode material comprising any one of selected from the group consisting of Lanthanum Strontium Cobaltite (LSC) sol, Lanthanum Strontium Cobalt Ferrite (LSCF) sol, Samarium Strontium Cobaltite Oxide (SSC) sol, and a combination thereof.

In addition, in the method for infiltrating with a precursor solution using moisture control according to the present invention, the precursor solution to be electrosprayed may be a solution having the same composition as the material of the cathode layer.

In addition, in the method for infiltrating with a precursor solution using moisture control according to the present invention, the sintering step (S5) may be performed at 950° C.

In addition, in the method for infiltrating with a precursor solution using moisture control according to the present invention, the heating step (S4) may be performed at 110° C.

Effect of the Invention

According to the present invention, it is possible to uniformly infiltrate the precursor solution over the entire surface area of the porous structure through electrospray deposition equipment and humidification, compared to the prior art, which is difficult to uniformly infiltrate the porous structure with the precursor solution. In the case of applying to the cathode layer of the solid oxide fuel cell, the precursor solution uniformly infiltrated over the entire area of the cathode layer is annealed to generate nanoparticles on the surface of particles of the existing porous cathode layer, thereby increasing the reaction area of the cathode layer. As a result, fuel cell efficiency is expected to increase.

DETAILED DESCRIPTION OF THE INVENTION

Figure 1:
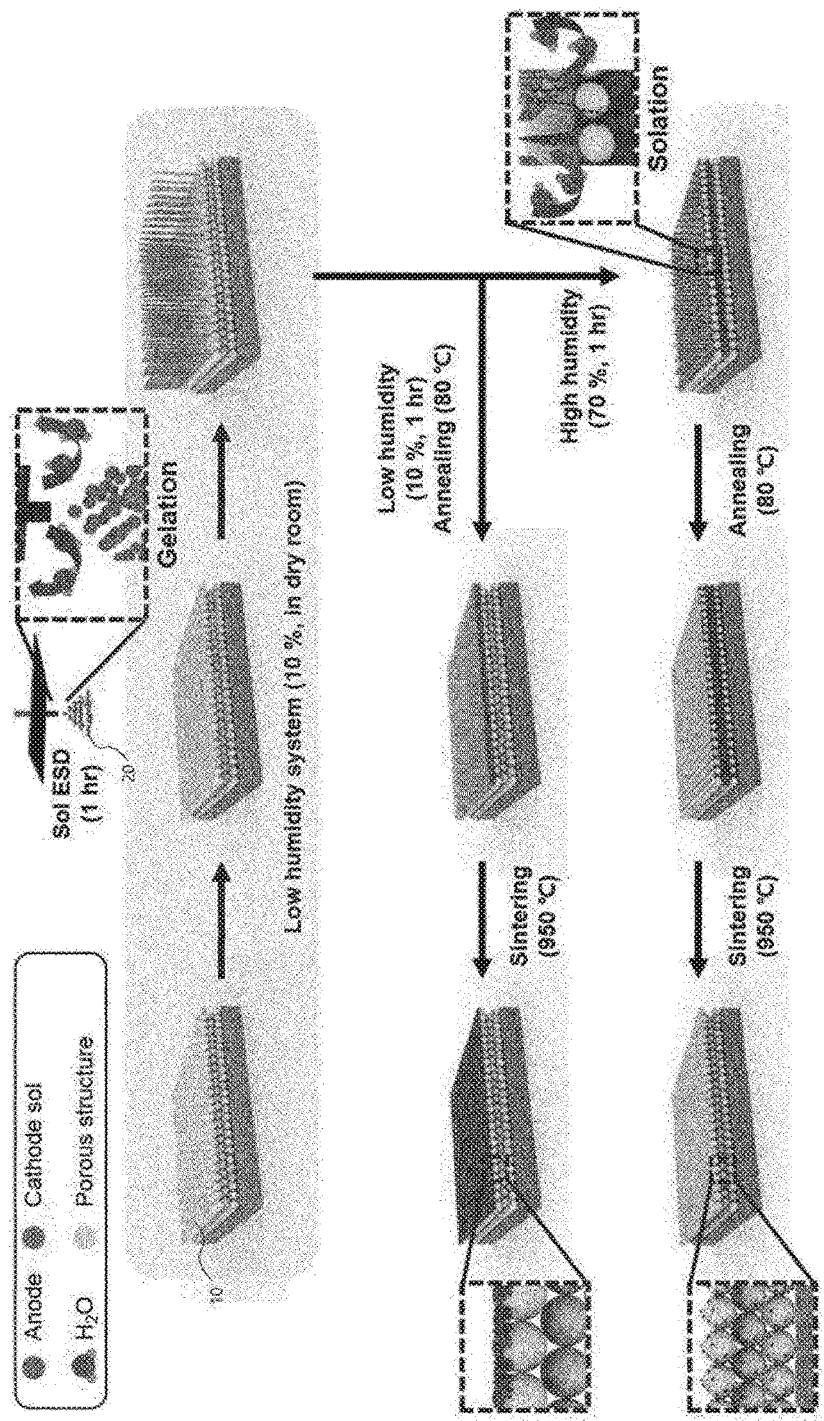
FIG. 1 shows a process of changing of a precursor solution electrosprayed onto a substrate having porous structures deposited according to each step of the present invention.

Hereinafter, a method for a porous structure using a solation/gelation phenomenon through moisture control according to an embodiment of the present invention will be described in detail. The accompanying drawings illustrate exemplary forms of the present invention, which are provided to explain the present invention in more detail, and the technical scope of the present invention is not limited thereto.

The method for controlling a porous structure using a solation/gelation phenomenon through moisture control according to the present invention comprises the steps of: (S1) providing a substrate having porous structures deposited thereon; (S2) depositing, by electrospraying, a precursor solution (chemical solution); (S3) humidifying the porous structures having the precursor solution deposited thereon; and (S4) heating (annealing) the humidified porous structures; and (S5) sintering the humidified porous structures.

Hereinafter, a method for controlling a porous structure using a solation/gelation phenomenon through moisture control according to the present invention will be described in detail for each step.

(S1) Providing a Substrate Having Porous Structures Deposited Thereon

First, a substrate 10 having porous structures deposited is provided. The substrate having porous structures deposited may be, for example, a ceramic substrate having porous ceramic structures deposited thereon.

In one embodiment, in the case of providing a substrate of an anode-supported fuel cell in an embodiment of a solid oxide fuel cell, the substrate may be a substrate having an anode layer, an electrolyte layer deposited on the anode layer and a buffer layer deposited on the electrolyte layer. The anode layer may be manufactured by powder pressing method, and in one embodiment, it may be an anode substrate having a predetermined thickness (for example, 1 mm) manufactured by placing NiO—YSZ granules mixed with 30 vol % of polymethylmethacrylate (PMMA) in a mold having a predetermined size (for example, 8 cm each in width and length) and applying a predetermined pressure. Since the electrolyte layer must selectively permeate oxygen ions, the electrolyte layer must have high ion conductivity and low electron conductivity, and it has a dense structure so that oxygen gas of the cathode and hydrogen gas of the anode are not mixed with each other. In the examples of the above-described fuel cell, the electrolyte layer may be, for example, any one selected from the group consisting of Yttria-stabilized Zirconia (YSZ), Gadolinium-doped Ceria (GDC), Samarium-doped Ceria (SDC), Yttrium-doped Barium-Zirconium (BZY), and a combination thereof. In one embodiment, YSZ may be used as a material of the electrolyte layer and GDC may be used as a material of the buffer layer. In the example of the solid oxide fuel cell, when the YSZ used for the electrolyte and the cobaltite component of the Lanthanum Strontium Cobaltite (LSC) used for the cathode are in physical contact with each other, a non-conductive film is formed to reduce the performance of the fuel cell. Thus, the buffer layer is a layer that is positioned between the electrolyte layer of YSZ and the cathode layer of LSC to prevent the two materials from physically contacting.

It may be provided the cathode layer of the porous ceramic structure deposited on the substrate as described above. In the cathode layer, since oxygen meets electrons to become oxygen ions, the electron conductivity should be high and the area of the three-phase interface where the reaction occurs should be large. The cathode layer may have for example porous ceramic structures comprising any one selected from the group consisting of LSC, Lanthanum Strontium Cobalt Ferrite (LSCF), Lanthanum Strontium Manganite (LSM), Samarium Strontium Cobaltite Oxide (SSC) and a combination thereof. In one embodiment, the cathode layer may have porous ceramic structures of a dual structure in which a CFL (mixture of GDC and LSC powder) layer is deposited on the buffer layer and an LSC layer is deposited on the CFL layer.

(S2) Depositing a Precursor Solution by Electrospraying

The precursor solution 20 is deposited on the porous structures by an electrospray deposition process. In this case, the precursor solution is electrosprayed on the porous structures by electrospray deposition (ESD) at a humidity lower than the humidity in the step (S3) to be described later to deposit the precursor solution. The precursor solution, which is a solution to be electrosprayed onto porous structures, includes alcohol-based, ester-based, water-based, and the like. For example, the precursor solution may be deposited on the porous structures of the substrate by an electrospray deposition process in a dry room or chamber, and in one embodiment it may be performed at 10% relative humidity. Since the precursor solution is gelled while being sprayed at the nozzle end of the electrospray deposition apparatus and deposited on the porous structures, the precursor solution is deposited in a dendritic structure as shown in FIG. 1.

For example, in the embodiment of the solid oxide fuel cell described above, in one embodiment, the precursor solution to be electrosprayed onto the substrate having the porous ceramic structure deposited (e.g., the cathode layer of the porous ceramic structure) may be a solution containing deionized water as a solvent and lanthanum nitrate hexahydrate, strontium nitrate, cobalt nitrate hexahydrate, citric acid, or the like. That is, the solution may have metal ions such as lanthanum, strontium, cobalt, etc. dissolved in deionized water, or citric acid as a surfactant. This precursor solution may be electrosprayed onto the porous cathode layer of the porous ceramic structure under conditions of 8 μm of silica nozzle, 7 kV of voltage, 0.025 ml/h of flow rate, 4 cm of tip-substrate distance, 1 hour of deposition time, and R.T. of a bottom temperature. In another embodiment, the precursor solution electrosprayed onto the substrate having the porous ceramic structures deposited thereon (e.g., the cathode layer of the porous ceramic structure) may be, for example, a cathode material which is produced of LSC sol, LSCF sol, SSC sol, or a combination thereof in a liquid state.

In this case, as shown in FIG. 1, the precursor solution electrosprayed on the porous structures of the substrate may be gelled and deposited in a dendritic structure as described above.

Figure 2:
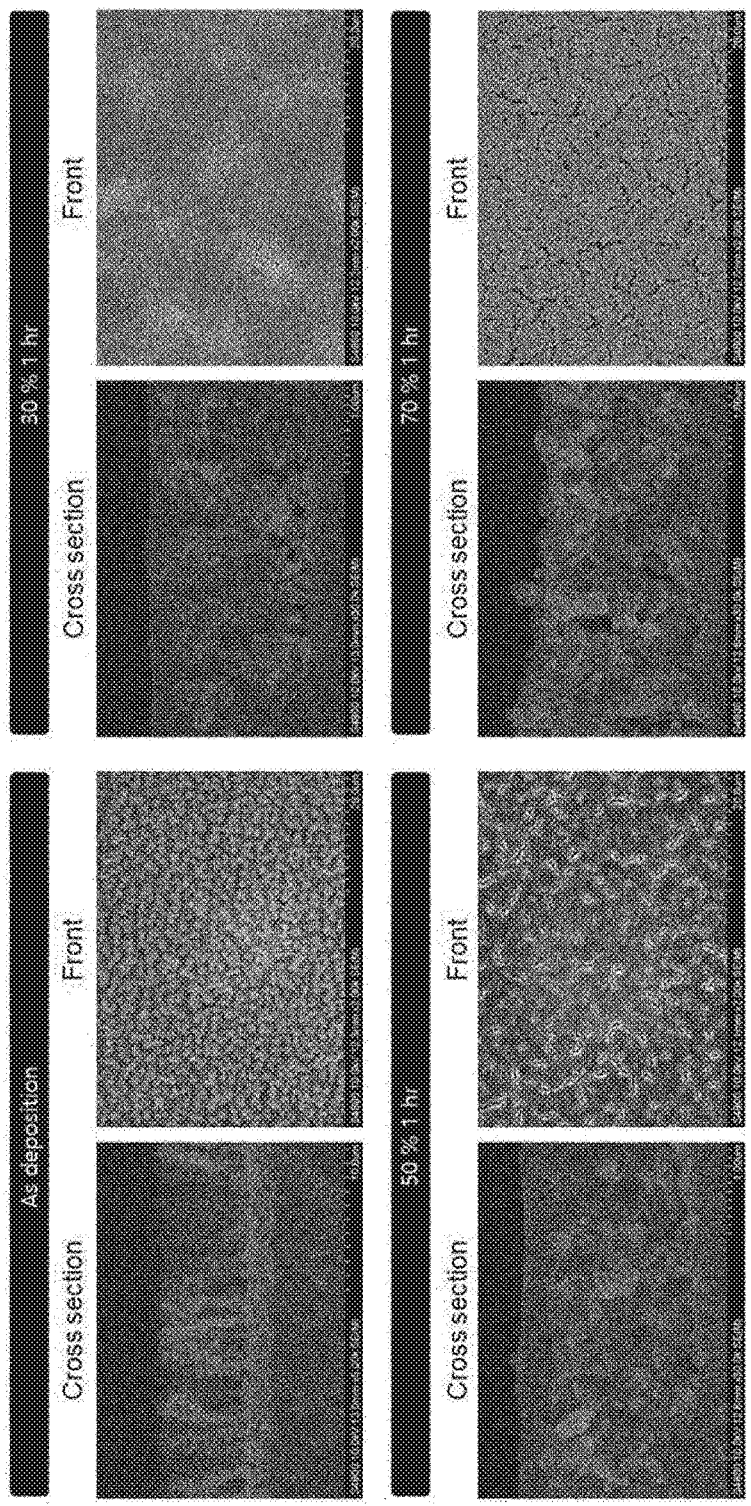
FIG. 2 shows a SEM photograph of the porous structure, according to the moisture control (control of the amount of humidification) according to the present invention.

(S3) Humidifying the Porous Structures Having the Precursor Solution Deposited Thereon In the step (S2), the precursor solution electrosprayed onto the porous structure of the substrate is deposited in a dendritic structure, as described above. However, when humidified, the precursor solution on the porous structure which is gelled and deposited in the dendritic structure meets with water molecule to change into a sol state, causing the dendritic structure to be collapsed and the solution to infiltrate into the porous structure. Accordingly, the precursor solution can be evenly distributed in the porous structure over a large area of the porous structure. The higher the amount of humidification, the higher the degree of infiltration. That is, in this step (S3), the amount of humidification and the degree of infiltration of the precursor solution into the porous structure have a linear relationship. Therefore, the degree of infiltration of the precursor solution can be controlled by controlling the amount of humidification. In this regard, FIG. 2 shows a SEM photograph of the porous structure under moisture control (control of humidification amount). As the amount of humidification increases (as the humidity increases), the degree of infiltration of the precursor solution into the porous structure also increases. Thus, by controlling moisture in this step (by adjusting the amount of humidification), it is possible to control the degree of infiltration of the precursor solution into the porous structure to obtain a desired porous structure.

For example, humidifying the porous structures having the precursor solution deposited thereon may be performed for 1 hour at a relative humidity of 70% or more. In the above-described embodiment of the solid oxide fuel cell, the electrosprayed precursor solution for LSC is gelled and deposited in a dendritic structure on the substrate (i.e., on the LSC layer) on which the cathode layer of the porous ceramic structure having a dual structure of the CFL layer and the LSC layer, is deposited. When humidified (e.g., for 1 hour at 70% relative humidity), the precursor solution for LSC meets with water molecules and cause phase change from gel to sol and the dendritic structure to be collapsed as shown in FIG. 1, so that it infiltrates into the porous structure of the cathode layer. In this case, unlike the method of infiltration using a pipette or a micropipette of the prior art, it is possible to infiltrate the precursor solution uniformly over the entire cathode layer.

In summary, when the step (S4) of humidifying the precursor solution deposited on the porous structures is applied to fabrication of the cathode layer of the fuel cell, the precursor solution may be uniformly infiltrated over the entire area of the cathode layer. The present invention is not limited to the above-described embodiment of fabricating a cathode layer of a fuel cell, and various embodiments, such as performing the step (S4) in the case of uniformly infiltrating the precursor solution on a substrate having another porous structure.

(S4) Heating the Humidified Porous Structures

The humidified porous structures in the step (S3) of humidifying the porous structure having the precursor solution deposited thereon may be subjected to the step (S5) of sintering the porous structure as a subsequent step, without the step (S4) of heating the humidified porous structure.

Additionally or alternatively, the humidified porous structure through the step (S3) of humidifying the porous structures having the precursor solution deposited thereon may be subjected to heating of the present step (S4). The temperature and time of the heating may be varied depending on the chemical composition and properties of the precursor solution and the substrate.

In the above-described embodiment of the solid oxide fuel cell, the substrate including the cathode layer humidified through the humidification step (S3) may be heated at a temperature of 110° C. for about 2 hours, and then proceed to the sintering step (S5) to be described later.

(S5) Sintering the Humidified Porous Structures

Next, the step of sintering the porous structures is performed. As described above, in the case of the humidified porous structures of the step (S3), it may proceed to the sintering step without heating of the step (S4). Additionally or alternatively, after performing the step (S4), the humidified porous structure in the step (S3) may be subjected to the sintering step as an intermediate heat treatment process. Likewise, the temperature and time of the sintering step may be varied depending on the chemical composition and properties of the precursor solution and the substrate.

When the above steps (S1) to (S5) are performed, the crystallized precursor solution nanoparticles are present inside the porous structure as shown in FIG. 1. On the other hand, when the heat treatment is performed without humidification after deposition of the precursor solution, that is, when the steps (S1), (S2), (S4) and (S5) are performed without the step (S3) of humidifying the porous structures having the precursor solution deposited thereon, the crystallized precursor solution nanoparticles are present on the porous structure, as shown in FIG. 1.

In the above-described embodiment of the solid oxide fuel cell, the substrate including the cathode layer heated after humidification may be sintered at a temperature of 950° C. for about 1 hour. After electrospraying the precursor solution onto the substrate including the cathode layer and humidifying, heating and sintering it, the precursor solution is uniformly infiltrated into the porous structures of the cathode layer provided in the step (S1) over the entire area of the cathode layer, so that the reaction area with the catalyst of the cathode layer is increased and thus the performance of the fuel cell can be improved.

When the precursor solution is infiltrated into the structure by using a conventional micro pipette or micro syringe, or by a vacuum process, there are disadvantages that the precursor solution to be infiltrated into the structure is difficult to be deposited evenly over the entire area of the structure and also precise control of in-situ infiltration is difficult. In addition, the prior art has a disadvantage of the prolonged process time because the sintering process and the infiltration process should be repeated several times. However, according to the present invention, the precursor solution can be deposited, by electrospraying, uniformly over the entire surface of the structure, and the precursor solution deposited on the structure can be changed, by humidifying, from a gel state to a sol state and infiltrated into the structure, and infiltration can be controlled easily by controlling the amount of humidification.

Meanwhile, although an embodiment of fabricating a solid oxide fuel cell has been described, the present invention is not limited thereto, and can be utilized, in another embodiment of fabricating a solid oxide fuel cell, such as in a proton conductive fuel cell (PCFC), a molten carbonate fuel cell (MCFC), and an alkaline fuel cell (AFC), a phosphate fuel cell (PAFC), a polymer electrolyte fuel cell (PEFC), a direct methanol fuel cell (DMFC), etc. It can be applied variously in infiltrating the precursor solution into the porous ceramic structure by electrospraying the precursor solution onto the porous ceramic structure.

In Example according to the present invention, the steps (S1) to (S5) are performed for the solid oxide fuel cell described above. That is, a substrate having an anode layer (anode), an electrolyte layer (electrolyte) and a cathode layer (CFL layer-LSC layer) stacked in this order is provided as a substrate having porous structures deposited (step (S1)), and on the substrate having porous ceramic structures deposited thereon (for example, the cathode layer of porous ceramic structure), a solution containing deionized water as a solvent and lanthanum nitrate hexahydrate, strontium nitrate, cobalt nitrate hexahydrate, citric acid, etc. as described above, i.e., a precursor solution is electrosprayed in a dry room of 10% relative humidity for 1 hours under conditions of 8 µm of silica nozzle, 7 kV of voltage, 0.025 ml/h of flow rate, 4 cm of tip-substrate distance, 1 hour of deposition time, and R.T. of a bottom temperature (step (S2)), and humidified for 1 hour in an environment of 70% relative humidity (step (S3)), heated for 2 hours at a temperature of 110° C. (step (S4)), and sintered for 1 hour at a temperature of 950° C. (step (S5)).

In Comparative Examples, porous structures having the precursor solution deposited thereon as in Example of the above-described solid oxide fuel cell, is provided, but the LSC sol as a precursor solution is not infiltrated (i.e., the steps (S2) to (S5) are not performed) (Comparative Example 1) and the same composition and same amount of precursor solution in Example was infiltrated into the cathode layer by the micropipette (Comparative Example 2).

Figure 3:
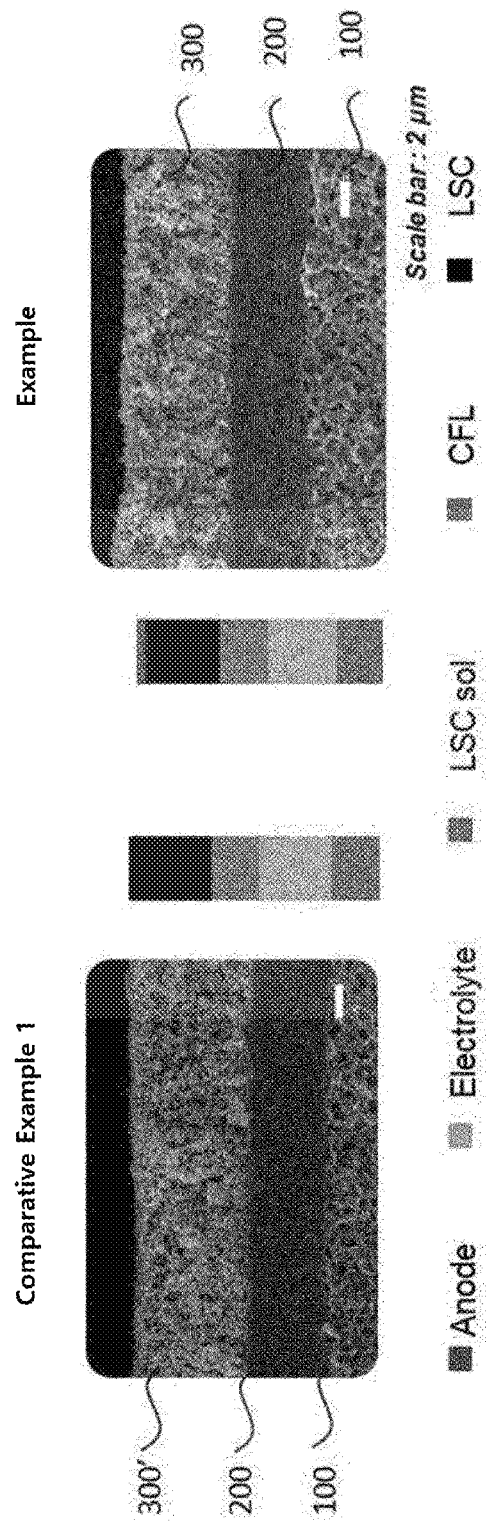
FIG. 3 shows a SEM photograph and a schematic diagram of a fuel cell sample provided in each case of Example according to the present invention and Comparative Example 1.

In this regard, FIG. 3 shows an SEM photograph and a schematic diagram of a fuel cell sample provided in Example according to the present invention and Comparative Example 1. The SEM image of Example shows an anode layer (anode) 100, an electrolyte layer (electrolyte) 200 and a cathode layer (CFL, LSC, LSC sol) 300, and the SEM image of Comparative Example 1 shows an anode layer (anode) 100, an electrolyte layer 200, and a cathode layer (CFL, LSC) 300'.

The performance of the fuel cell electrochemical properties for the fuel cell samples provided in Example according to the present invention, Comparative Example 1 and Comparative Example 2 were evaluated, respectively.

Figure 4A:
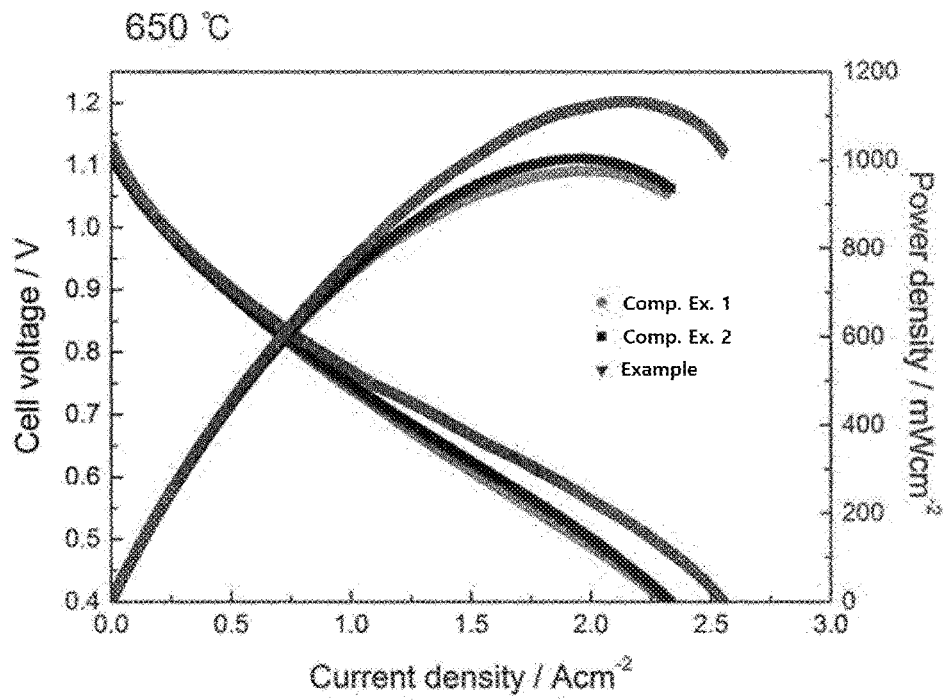
FIGS. 4A and 4B show I-V-P curves of Example according to the present invention, Comparative Example 1 and Comparative Example 2, respectively.
Figure 4B:
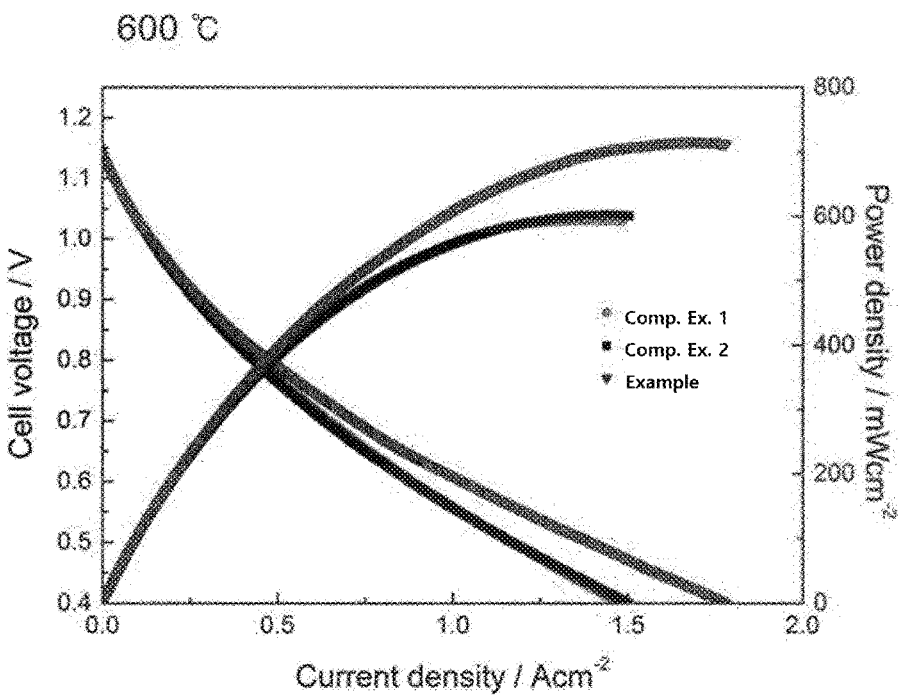
Figure 5A:
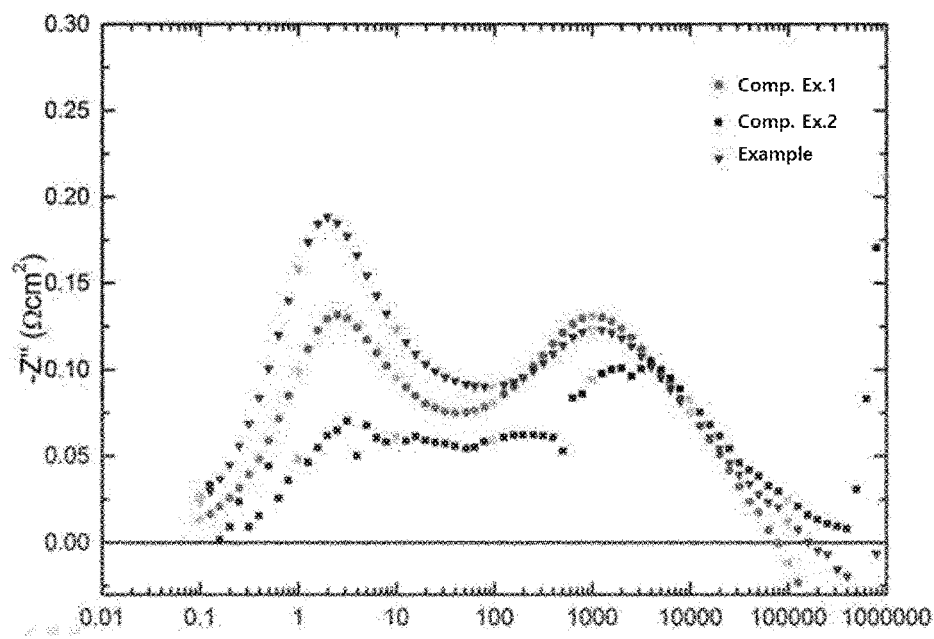
FIGS. 5A to 5C show the results of impedance measurement of Example according to the present invention, Comparative Example 1 and Comparative Example 2, respectively.
Figure 5B:
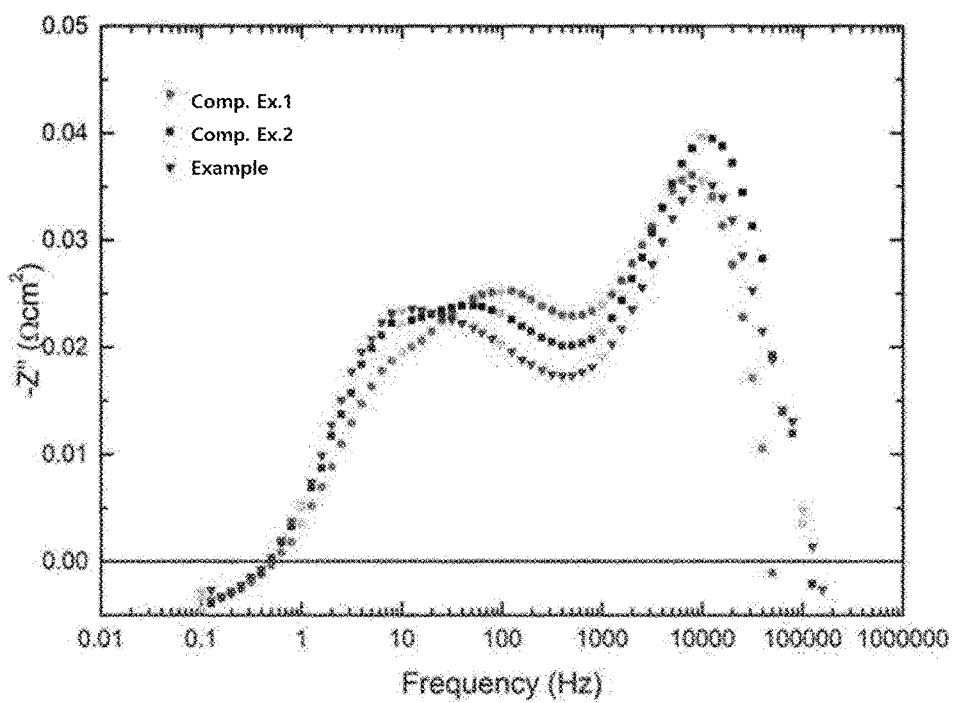
Figure 5C:
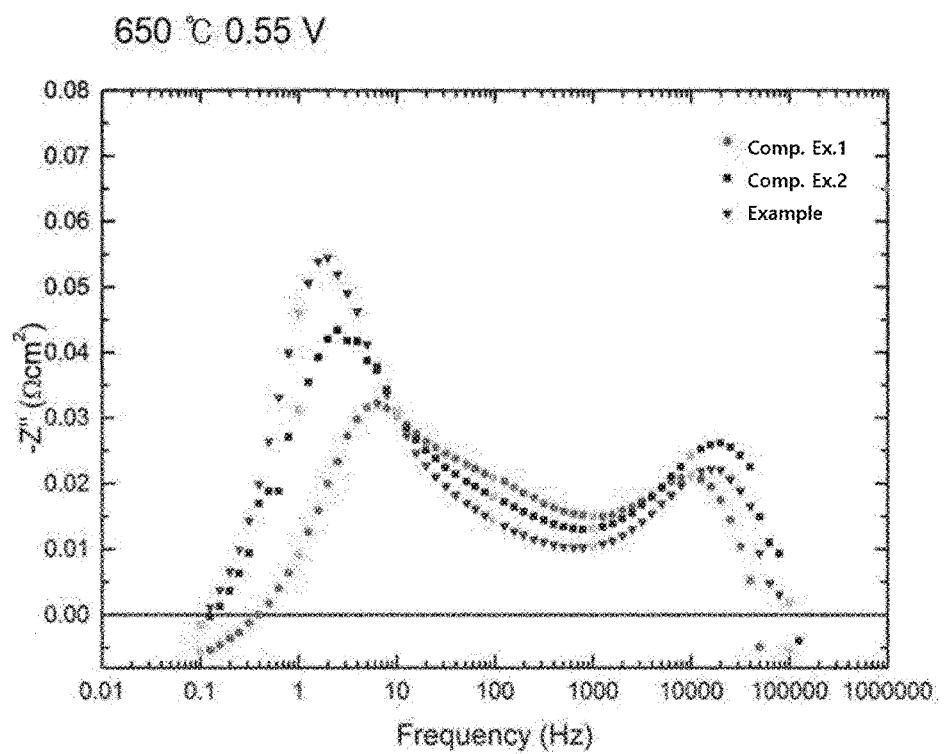

FIGS. 4A and 4B show I-V-P curves of Example according to the present invention, Comparative Example 1 and Comparative Example 2, respectively. FIGS. 5A to 5C show the results of impedance measurement of Example according to the present invention, Comparative Example 1 and Comparative Example 2, respectively.

First, referring to FIGS. 4A and 4B, it can be seen that at the measurement temperature of both of 650° C. and 600° C., the peak power density of Example is significantly higher than that of Comparative Example 1 and Comparative Example 2. In this regard, reference is made to Tables 1 to 3 below.

TABLE 1

| | Measurement temperature | Ohm. ASR at OCV ($\Omega$-cm$^2$) | Pol. ASR at OCV ($\Omega$-cm$^2$) | Peak Power Density (mW/cm$^2$) |
|---|---|---|---|---|
| Comparative Example 1 | 650° C. | 0.097 | 0.765 | 976.14 |
| | 600° C. | 0.158 | 1.191 | 594.78 |

TABLE 2

| | Measurement temperature | Ohm. ASR at OCV ($\Omega$-cm$^2$) | Pol. ASR at OCV ($\Omega$-cm$^2$) | Peak Power Density (mW/cm$^2$) | Power increasing rate |
|---|---|---|---|---|---|
| Comparative Example 2 | 650° C. | 0.090 | 0.645 | 1003.52 | 2.80% |
| | 600° C. | 0.155 | 1.36 | 602.7 | 1.33% |

TABLE 3

| | Measurement temperature | Ohm. ASR at OCV ($\Omega$-cm$^2$) | Pol. ASR at OCV ($\Omega$-cm$^2$) | Peak Power Density (mW/cm$^2$) | Power increasing rate |
|---|---|---|---|---|---|
| Example | 650° C. | 0.064 | 0.898 | 1135.82 | 16.36% |
| | 600° C. | 0.118 | 1.348 | 716.56 | 20.47% |

Specifically, at the measurement temperature of 650° C., the maximum power density of the Example was significantly increased to 1135.82 mW/cm$^2$, compared to the maximum power density of 976.14 mW/cm$^2$ and 1003.52 mW/cm$^2$ in Comparative Examples 1 and 2 respectively. At the measurement temperature of 600° C., the maximum power density of Example was significantly increased to 716.56 mW/cm$^2$, compared to the maximum power density of 594.78 mW/cm$^2$ and 602.7 mW/cm$^2$ in Comparative Examples 1 and 2 respectively. In addition, at the measurement temperature of 650° C., the ohmic surface resistivity (Ohm. ASR) of Example was significantly lowered to 0.064 Ω-cm$^2$, compared to the ohmic surface resistivity (Ohm. ASR) of 0.097 Ω-cm$^2$ and 0.090 Ω-cm$^2$ in Comparative Examples 1 and 2 respectively. At the measurement temperature of 600° C., the ohmic surface resistivity (Ohm. ASR) of Example was significantly lowered to 0.118 Ω-cm$^2$, compared to the ohmic surface resistivity (Ohm. ASR) of 0.158 Ω-cm$^2$ and 0.155 Ω-cm$^2$ in Comparative Examples 1 and 2 respectively.

In addition, for further analysis, the impedance measurement was carried out from 1000000 Hz to 0.1 Hz frequency at the measurement temperature of 650° C. and the results of the impedance measurement are shown in FIGS. 5A to 5C. Referring to the graphs of 0.75 V and 0.55 V at the measurement temperature of 650° C. in FIGS. 5A to 5C, it can be seen that the impedance value decreases in the order of Comparative Example 1>Comparative Example 2>Example in the mid frequency (10 Hz to 1000 Hz) in which the cathode layer is known to be dominant. In this regard, it is found that the performance of the cathode layer is improved, for example an oxygen ion transfer rate is improved. For reference, in "PHYSICALLY-BASED DECONVOLUTION OF IMPEDANCE SPECTRA: INTERPRETATION, FITTING AND VALIDATION OF A NUMERICAL MODEL FOR LANTHANUM STRONTIUM COBALT FERRITE-BASED SOLID OXIDE FUEL CELLS", A. Bertei et. al, Electrochimica Acta 208 (2016) 129-141, there is stated the cathode/electrolyte interface region as the 1 kHz region. As a result of analysis using this, the results of FIGS. 5A to 5C were obtained.

It will be appreciated that the technical configuration of the present invention described above may be embodied in other specific forms by those skilled in the art without changing the technical spirit or essential features of the present invention. Therefore, it should be understood that the embodiments described above are exemplary in all respects and not restrictive. In addition, the scope of the present invention is shown by the claims below, rather than the above detailed description. In addition, the scope of the present invention is defined by the claims to be described later, rather than the above detailed description. In addition, all changes or modifications derived from the meaning and scope of the claims and equivalent concepts should be construed as being included in the scope of the present invention.

INDUSTRIAL AVAILABILITY

According to the present invention, it is possible to infiltrate the precursor solution uniformly into the entire surface area of the porous structure through electrospray deposition equipment and humidification, compared to the prior art which has difficulty in uniformly infiltrating the precursor solution into the porous structure. In the case of applying to the cathode layer of the solid oxide fuel cell, the precursor solution uniformly infiltrated into the entire area of the cathode layer is heat-treated to generate nanoparticles on the surface of particles of the existing porous cathode layer, thereby increasing the reaction area of the cathode layer. As a result, the efficiency of fuel cell is expected to increase.

What is claimed is:

1. A method for infiltrating with a precursor solution using moisture control, comprising the steps of:
    (S1) providing a substrate having porous structures deposited thereon;
    (S2) depositing, by electrospraying, a precursor solution on the substrate having porous structures deposited thereon;
    (S3) humidifying the porous structures having the precursor solution deposited thereon; and
    (S5) sintering the humidified porous structures.

2. The method for infiltrating with a precursor solution using moisture control according to claim 1, wherein in the depositing step (S2), the precursor solution is electrosprayed on the substrate having the porous structures deposited thereon under a relative humidity of 10%.

3. The method for infiltrating with a precursor solution using moisture control according to claim 1, wherein in the humidifying step (S3), humidification of the porous structures having the precursor solution deposited thereon is performed under a relative humidity of 70%.

4. The method for infiltrating with a precursor solution using moisture control according to claim 1, wherein in the humidifying step (S3), the degree of infiltration of the precursor solution into the porous structure is controlled according to the amount of humidification.

5. The method for infiltrating with a precursor solution using moisture control according to claim 1, wherein the substrate having the porous structures deposited thereon is a ceramic substrate having the porous ceramic structures deposited thereon.

6. The method for infiltrating with a precursor solution using moisture control according to claim 1, wherein the substrate having the porous structures deposited thereon comprises an anode layer, an electrolyte layer, and a cathode layer of a solid oxide fuel cell.

7. The method for infiltrating with a precursor solution using moisture control according to claim 6, wherein the porous structure includes a cathode layer.

8. The method for infiltrating with a precursor solution using moisture control according to claim 6, wherein the precursor solution to be electrosprayed is a solution comprising deionized water as a solvent and any one selected from the group consisting of lanthanum nitrate hexahydrate, strontium nitrate, cobalt nitrate hexahydrate, citric acid, and a combination thereof.

9. The method for infiltrating with a precursor solution using moisture control according to claim 6, wherein the precursor solution to be electrosprayed is a cathode material comprising any one of selected from the group consisting of Lanthanum Strontium Cobaltite (LSC) sol, Lanthanum Strontium Cobalt Ferrite (LSCF) sol, Samarium Strontium Cobaltite Oxide (SSC) sol, and a combination thereof.

10. The method for infiltrating with a precursor solution using moisture control according to claim 6, wherein the precursor solution to be electrosprayed is a solution having the same composition as the material of the cathode layer.

11. The method for infiltrating with a precursor solution using moisture control according to claim 6, wherein sintering step (S5) is performed at 950° C.

12. The method for infiltrating with a precursor solution using moisture control according to claim 1, wherein the method further comprises (S4) heating the humidified porous structures, between the humidifying step (S3) and the sintering step (S5).

13. The method for infiltrating with a precursor solution using moisture control according to claim 12, wherein the substrate having the porous structures deposited thereon comprises an anode layer, an electrolyte layer, and a cathode layer of a solid oxide fuel cell.

14. The method for infiltrating with a precursor solution using moisture control according to claim 13, wherein the heating step (S4) is performed at 110° C.

15. The method for infiltrating with a precursor solution using moisture control according to claim 13, wherein the porous structure includes a cathode layer.

16. The method for infiltrating with a precursor solution using moisture control according to claim 13, wherein the precursor solution to be electrosprayed is a solution comprising deionized water as a solvent and any one selected from the group consisting of lanthanum nitrate hexahydrate, strontium nitrate, cobalt nitrate hexahydrate, citric acid, and a combination thereof.

17. The method for infiltrating with a precursor solution using moisture control according to claim 13, wherein the precursor solution to be electrosprayed is a cathode material comprising any one of selected from the group consisting of Lanthanum Strontium Cobaltite (LSC) sol, Lanthanum Strontium Cobalt Ferrite (LSCF) sol, Samarium Strontium Cobaltite Oxide (SSC) sol, and a combination thereof.

18. The method for infiltrating with a precursor solution using moisture control according to claim 13, wherein the precursor solution to be electrosprayed is a solution having the same composition as the material of the cathode layer.

19. The method for infiltrating with a precursor solution using moisture control according to claim 13, wherein the sintering step (S5) is performed at 950° C.

* * * * *